E. FOWLER AND J. V. LEWIS.
CULTIVATOR.
APPLICATION FILED DEC. 18, 1918.

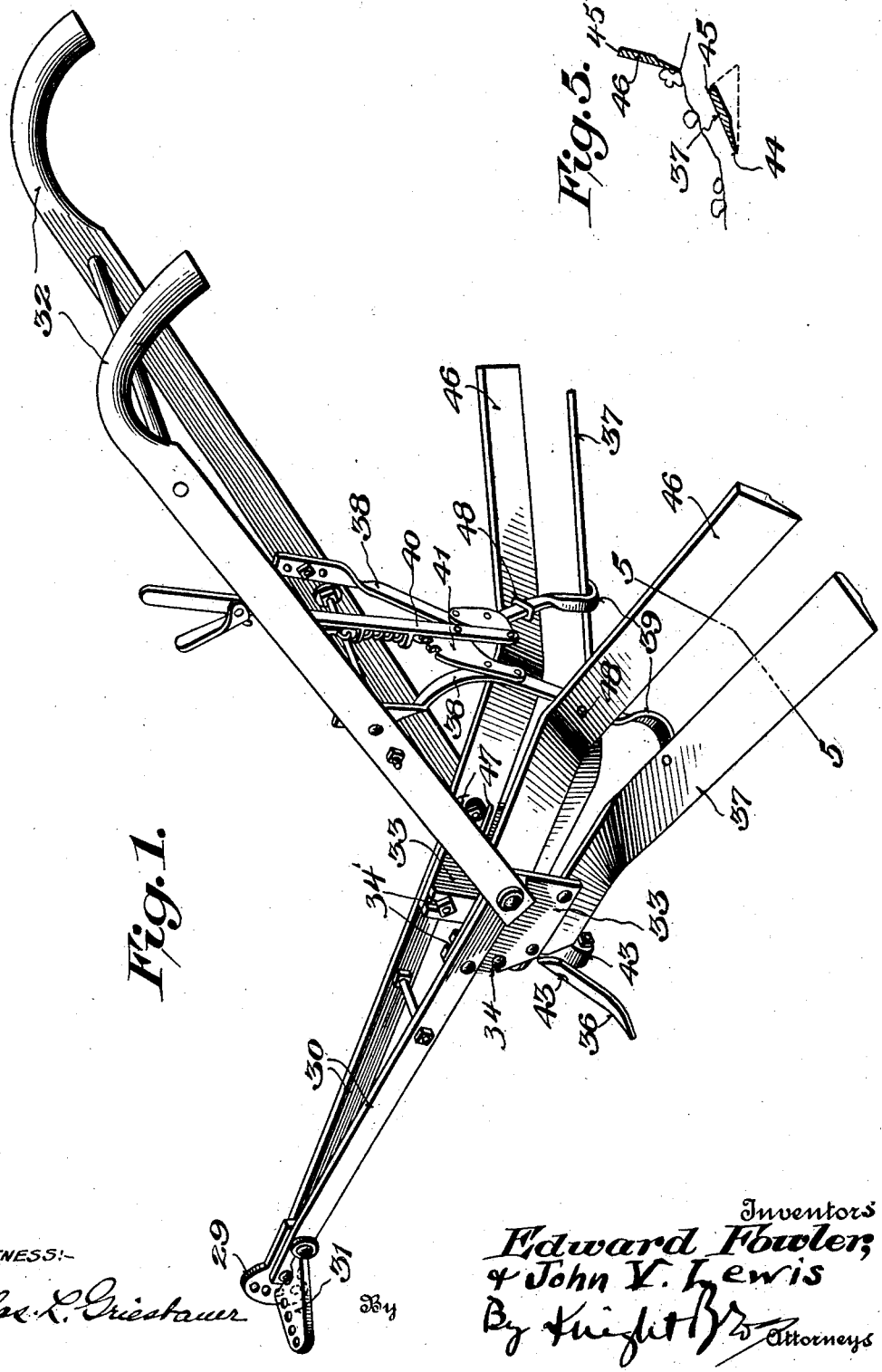

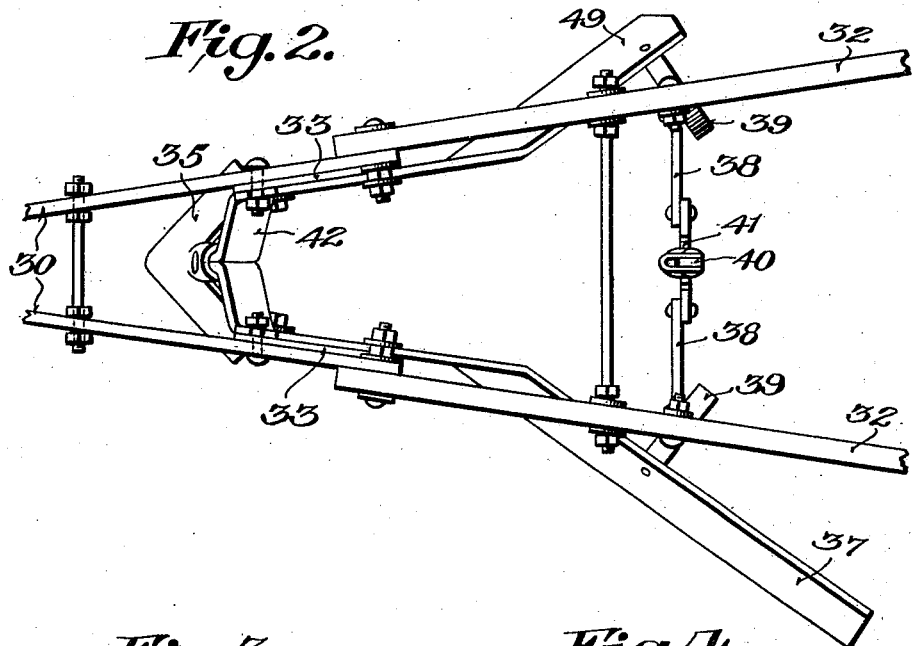
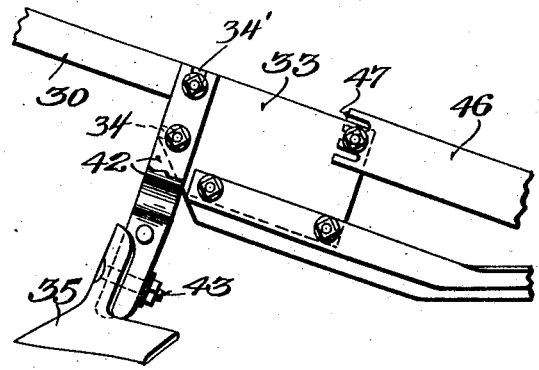
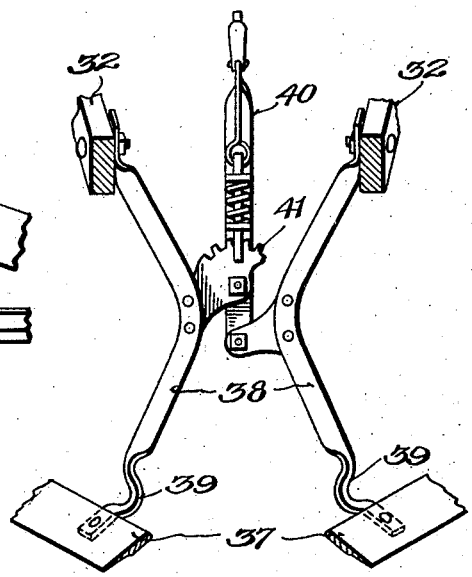

1,408,575.

Patented Mar. 7, 1922.
3 SHEETS—SHEET 3.

Inventor
Edward Fowler,
& John V. Lewis

UNITED STATES PATENT OFFICE.

EDWARD FOWLER AND JOHN VICTOR LEWIS, OF ST. ELMO, TENNESSEE.

CULTIVATOR.

1,408,575.　　　　Specification of Letters Patent.　　Patented Mar. 7, 1922.

Application filed December 18, 1918. Serial No. 267,377.

*To all whom it may concern:*

Be it known that we, EDWARD FOWLER and JOHN VICTOR LEWIS, citizens of the United States, residing at St. Elmo, in the county of Hamilton and State of Tennessee, have invented certain new and useful Improvements in Cultivators, of which the following is a specification.

The present invention relates to farmers' implements, and more particularly to a cultivator, which is intended to replace many of the different implements which are generally employed during a season. In other words, the object of the invention is to provide an implement which can be employed not only for preparing the seed bed, but also for subsequent cultivation, weeding, removing stones and clods, and so on.

After plowing and harrowing, this implement may be employed to prepare a seed bed. All the fine soil slips between the upper and lower blades, forming a seed bed in which there is a perfect mulch. The clods, trash or loose stones, unable to pass through the narrow space between the upper and lower blades, slide along to the ends of the blades and are left in the middle between rows.

After the plants appear above the ground the implement is again employed, this time as a "cultivator" proper, when it removes all weeds and loosens the soil on both sides of the row of plants simultaneously, leaving a perfect level surface behind it, which is entirely free from furrows that would otherwise cause washing during heavy rains. In dry seasons the fine dust mulch made by this cultivator preserves the moisture and plant food, and yet, offers an ideal surface after even the lightest rainfall.

When the plants become too large for cultivating astride the rows, the "cultivator" is run between the rows, loosening the soil and piling the fine dust up over the roots in the rows.

When, later in the season, the roots of the plants have spread out between the rows, the cultivator is again run between them, only touching the surface and thus leaving the spread-out roots untouched. Ordinary cultivators provided with spikes and pointed blades generally run too deep and are, as a consequence, apt to tear up and injure the roots of the plants.

These and other advantages, which will appear from the description, are all possessed by this implement.

In the accompanying drawings my invention is illustrated, and

Figure 1 is a perspective view of a cultivator constructed in accordance with my invention;

Figure 2 is a detail view of one form of earth-stirring device, its supporting bracket and cultivator blades, showing a relatively long blade on one side and a relatively short blade on the other side.

Figure 3 is a side view on an enlarged scale, of a portion of the device, showing the blades and another form of earth stirring device;

Figure 4 is a detail view of the handle braces and adjusting lever;

Figure 5 is a vertical sectional view on the line 5—5 of Figure 1, showing the relative position of the upper and lower blades;

Figure 6:
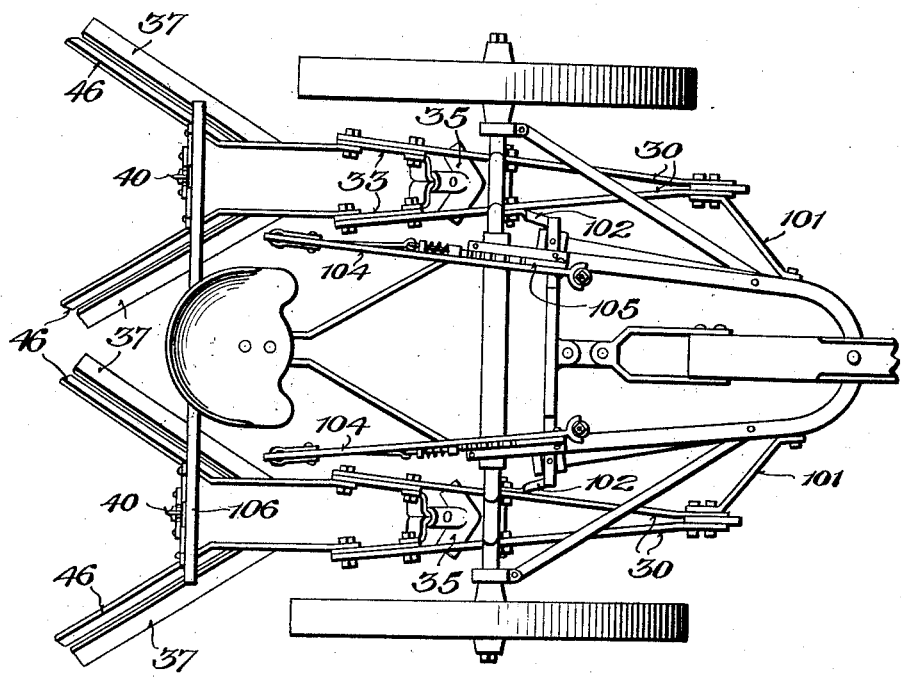
Figure 6 is a top plan view of a wheel attachment for two of the cultivators.

The usual pair of draw bars 30, forming a frame and comprising a beam spread out rearwardly from the front end where they are connected, carry a suitable clevis 29 for the draft animal, and may also be provided with a side clevis 31, and this clevis may be adjusted up and down on the clevis 29, to go deep or shallow. At the rear end of the bars is a hinged pair of handle bars 32. Each of the bars 30 carries frame plates 33 with outwardly slotted holes 34. The lower blades 37, which are rearwardly divergent in horizontal plane and slightly inclined outwardly in transverse direction, are secured to the frame plates 33 and carry a spreader 38 for the handle bars 32. Near the point of attachment to the blades, the spreader 38 is bent outwardly, as at 39, in such a manner that the loosened soil, cut by the blade point 36 or the share 35, is turned over. Between the spreader, which is in the shape of the letter X, is an adjusting lever 40, (see particularly Figure 4), having a pivotal connection on one of the spreader bars and having a pawl for engaging the notches in the rack 41 on the opposite spreader bar, the lever being also pivotally fastened to the rack. By setting the lever to one side or the other, the relative position between the handle bars 32 and the blades 37 will thus be adjusted in order to change the width of the cut or the horizontal angle between the blades 37.

A fork-shaped standard 42 is removably attached by bolts to the frame plates 33 (see particularly Figure 2 and 3), and is so constructed that it may receive the bolt 43 for securing to it either the form of blade 36 or the form of share 35. It will thus be seen that the standard will support a soil stirring device of proper form in accordance with the work which is required by the cultivator, or the standard 42 may be removed entirely, as, for instance, when the implement is made to straddle over the new plants, or for cultivation on both sides of the row. The removal of the standard 42 is further facilitated by the open bolt slots 34′ at its upper ends, so that bolts at this end will remain in the frame plates, while the bolts in slots 34 will slip out from the frame plates and stay in the standard.

The lower blades 37, as already described, are bolted to the frame plates 33 and are preferably given a shape, of which the cross-section is shown in Figure 5, that is to say, its upper face 37 is plane and slightly inclined to the horizontal, a top portion 45 of the blade being of uniform thickness or rectangular cross-section, while the bottom half is wedge-shaped and joined to the top portion by an offset or shoulder. In other words, the bottom surface on the forward side is substantially placed parallel to the ground or inclined a few degrees thereto, so that the thin edge 44 is formed on the lower side. As a consequence, the blade is practically self-sharpening, as it is worn away parallel to the under surface when running over the ground. The right and left hand lower blades may be of the same length, as shown in Figure 6, or one of them, 49, may be made shorter than the other. This is for the purpose of alining the soil on one side of a planted row at a time when the shorter blade is run nearest to the row and the other, consequently, does not extend quite across to the next row, but during the operation of the cultivator cuts through the adjacent alined soil.

The upper blades 46, which are deflected similarly to the lower blades, are provided with forward bolt slots 47 for attachment to the frame plates 33, which are provided with bolts for this purpose. By means of studs 48 they are also held in position on the bars of the spreader 38. It will thus be seen that the upper blades 46 are easily removable or exchangeable.

As best seen in Figure 1, the edges of the upper and lower blades run parallel, but while the blades 37 are placed substantially flat on the ground, the upper blades 46 are raised on edge or very slightly inclined against the vertical. The upper and lower blades are also spaced apart so that the surface of the soil, loosened by the lower blades, will pass between the upper and lower ones, while weeds and stones, clods, and other trash will be pushed to the sides by the upper blades and collected in a row on each side of the cultivator as it passes along the ground.

In some cases it is desirable to have the lower blades of different length (see, for instance, Figure 2), where the right lower blade 49 is considerably shorter than the left one 37. This is useful for a second or third cultivation of the soil when the plants have grown too large for cultivating astride the row. The end of the shorter blade is then run close up to the row to be cultivated, while the longer blade only reaches partly across the space between two adjacent rows and does not touch the row of plants on the other side, but in passing through the previously rejected material, the same will be broken up or pulverized, and due to the fact that the blades pass beneath or through the rejected material, any grass will be destroyed.

Figure 7:
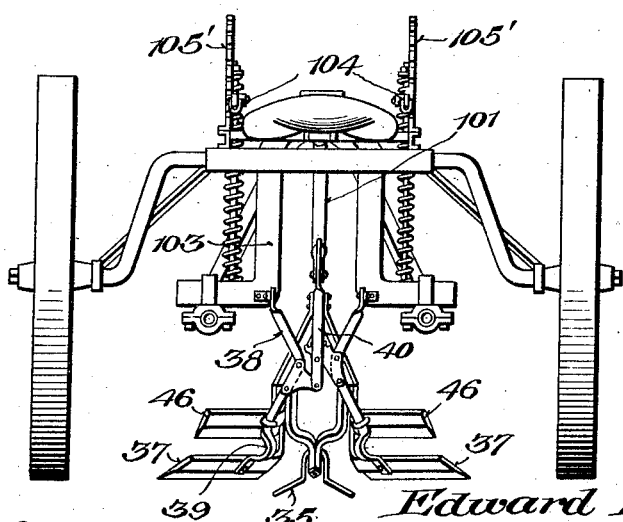
Figure 7 is a rear elevational view of Figure 6, with only one cultivator attached.

Instead of hitching the cultivator directly to a horse it is often desirable to use a sulky, (see Figures 6 and 7). If two cultivators are to be used, the front ends of the clevis beams are attached to braces 101 of the sulky, and, the two beams are still further connected by means of tie rods 102 to a yoke 103 on the sulky. By means of hand levers 104 and a pawl and ratchet device 105, the cultivator may be lifted from the ground or set at a desirable angle thereto. The two cultivators are preferably connected by means of a cross-bar 106, so as to be carried along at a constant distance, and adjusting levers 40, acting between the spreader 38, may also be provided in the same manner as has already been described.

In Figure 7 a single cultivator is shown attached to a sulky.

From the foregoing description it will be apparent that the implement herein described is capable of a number of uses with a minimum amount of adjustment or rearrangement of the parts. For example, when the share or hoe is in place and the parts are arranged as shown in Figure 1, the device is capable of being used without discing and harrowing to prepare the seed bed. When thus used, all the fine soil slips between the upper and lower blades, forming the seed bed, which is a perfect mulch. All clods, trash or loose stones of such character as will not easily pass through the narrow space between the upper and lower blades is discarded and caused to slide along the blades to the ends, leaving a line of extraneous matter in the middle between two rows. With the share or hoe in the center removed, the device is adapted to be used for early cultivation astride the row, barring off and cultivating both sides of the row at one trip through. By the action of the upper blades only fine pulverized soil is left on either side of the growing plant. All grass and weeds are cut off and thrown to the middle between two rows. A perfectly level surface is left behind the cultivator, entirely free from little furrows which would cause washing during heavy rains. In a dry season the fine dust mulch made by this cultivator preserves the moisture and plant food, and yet offers a sufficient surface for receiving even the lightest rail-fall.

In the event that the plant becomes too large for cultivation astride the row, the device may be used with a short blade on the right, to throw the fine mulch prepared by previous cultivation to the root of the growing plant. It is understood, of course, that during this time the share or hoe is replaced. The long blade on the left destroys all weeds and further pulverizes the soil between the rows, while the short blades throw the fine mulch toward the roots of the plant. In this form of the device it is not necessary to employ the upper blades, for the reason that all trash, clods, etc., have been removed from the proximity of the plants by the previous cultivation astride the row. The clods and trash previously thrown to the middle between the rows may easily slip over the long blade without having the line disturbed.

For late cultivation, to keep down the final growth of weeds and vines and to break the hard crust forming after rains, only the long blades are used. These blades move parallel to and above the roots of the crop, which, toward maturity, come close to the surface. The cultivator blades do not injure these roots, although completely destroying all gross, weeds, vines and capillaries which form in the ground after rain. This is a particular advantage, not characteristic of those types of cultivators in which vertical teeth are employed, for the latter in practice run across the crop roots generally deep enough to destroy many of them, making late cultivation with such tools impossible. It is well known that when crop roots are damaged the initial energy of the plant is devoted to restoring such roots before further developing either stalk or fruit, and, as a result, the development of the plant is materially retarded. These disadvantages are not present during the cultivation of the ground or crops in which my present invention is employed.

Especial attention is called to the fact that the vertical central opening in the standard permits the soil to pass up over the blade through said opening into the furrow, and owing to the fact that the peculiar form of cultivator blades and curved spreader bars guide the fine soil back into the furrow, no open furrows are left, as the cultivator passes along the row.

We claim:

1. In combination with an agricultural implement of the class described, having a frame; of a removable fork-shaped standard and a soil-stirring device carried by said standard; said frame being provided with a pair of depending plates at its rear end, there being outwardly open holes in said plates and standard, and bolts for engaging in said holes for rigidly securing the standard to the plates.

2. In combination with an agricultural implement of the class described, having a frame; of a removable fork-shaped standard and a soil-stirring device carried by said standard; said frame being provided with a pair of depending plates at its rear end, a plurality of trailer blades, there being outwardly open holes in said plates, blades and standard, and bolts for engaging in said holes for rigidly securing said trailer blades and standard to the plates.

3. In an agricultural implement of the class described, having a frame with a soil-stirring device and a plurality of trailer blades; a pair of handle bars on said frame, a spreader connecting each handle bar and an adjacent trailer blade, said spreader having an outward bend near the ground.

4. In an agricultural implement of the class described, a frame, a blade connected at its forward end to said frame, and means including a spreader connecting said blade to the frame at a point rearward of the first mentioned connection, said spreader having a sub-horizontal portion adjacent the blade extending inwardly to a point behind the forward parts of said blade and frame.

5. In combination with an argicultural implement of the class described, having a frame; of a removable soil-stirring device attached to said frame, a cultivator blade attached to said frame on either side of said plow share and diverging rearwardly therefrom, and its flat underface placed slightly inclined to the ground, an upper blade similarly attached at a distance above each of said first blades and having the same diverging angle as the latter, but placed on edge approximately vertically.

EDWARD FOWLER.
JOHN VICTOR LEWIS.